United States Patent [19]

Toyoda

[11] 4,352,548
[45] Oct. 5, 1982

[54] CAMERA HAVING A VARIABLE PROGRAM EXPOSURE CONTROL DEVICE

[75] Inventor: Kenji Toyoda, Kawasaki, Japan

[73] Assignee: Nippon Kogaku K.K., Tokyo, Japan

[21] Appl. No.: 256,951

[22] Filed: Apr. 23, 1981

Related U.S. Application Data

[63] Continuation of Ser. No. 41,414, May 22, 1979, abandoned.

[30] Foreign Application Priority Data

May 31, 1978 [JP] Japan .................................. 53-64373

[51] Int. Cl.³ .......................... G03B 17/12; G03B 7/08
[52] U.S. Cl. ........................................ 354/286; 354/29
[58] Field of Search .............................. 354/29, 36–39, 354/43, 60 R, 286, 289

[56] References Cited

U.S. PATENT DOCUMENTS

| | | | |
|---|---|---|---|
| 3,950,765 | 4/1976 | Namba et al. .......................... | 354/29 |
| 3,964,073 | 6/1976 | Kobori et al. .......................... | 354/29 |
| 4,011,569 | 3/1977 | Mashimo et al. ....................... | 354/38 |
| 4,062,023 | 12/1977 | Kobori et al. .......................... | 354/38 |
| 4,118,713 | 10/1978 | Murakami et al. ............. | 354/286 X |
| 4,150,889 | 4/1979 | Ueda et al. ......................... | 354/38 X |
| 4,167,313 | 9/1979 | Tsunefuji .......................... | 354/38 X |

FOREIGN PATENT DOCUMENTS 2549380  5/1977  Fed. Rep. of Germany ...... 354/286

Primary Examiner—L. T. Hix
Assistant Examiner—Thomas H. Tarcza
Attorney, Agent, or Firm—Fitzpatrick, Cella, Harper & Scinto

[57] ABSTRACT

In a camera of the interchangeable lens type having a body having a program exposure control device and a lens mount; and an interchangeable lens mounted on the body through the mount, there is provided program varying means in the program exposure control device, information means on the interchangeable lens, and interlock means for setting the program varying means so that when the interchangeable lens is mounted on the body, the program varying means selects a program corresponding to the information possessed by the information means.

9 Claims, 5 Drawing Figures

CAMERA HAVING A VARIABLE PROGRAM EXPOSURE CONTROL DEVICE

This is a continuation, of application Ser. No. 41,414, filed May 22, 1979, now abandoned.

BACKGROUND OF THE INVENTION

1. Field of the Invention

This invention relates to a camera for the interchangeable lens type having a variable program exposure control device which enables automatic selection of the best suitable program for each interchangeable lens.

2. Description of the Prior Art

In the existing cameras of the single program exposure control type, the combination of the aperture and shutter speed corresponding to the brightness of an object is restricted to one combination. Where such a single program is incorporated into a camera of the interchangeable lens type, it is a suitable program for a certain type of lens but cannot always be said to be an appropriate program for other types of lenses.

That is, for example, in an interchangeable lens having a long focal length, it is necessary to prepare a program in which importance is attached to increasing of the shutter speed because such lens is readily affected by a vibration of the hand. Also, in a macro lens, it is necessary to prepare a program in which importance is attached to stop-down of the aperture because, in such lens, the depth of field is often shallow due to close-up photography.

SUMMARY OF THE INVENTION

In view of the above-noted situations, the present invention intends to provide a program exposure control device which enables automatic selection of the best suited program for each of various interchangeable lenses.

The present invention further intends to provide an interchangeable lens which is used for such a program exposure control device.

According to the present invention, an information transmitting member having modified information corresponding to the main usage of photography of an interchangeable lens such as telephoto, standard or macro lens is provided on the interchangeable lens and there is also provided a camera having a variable program exposure control device provided with means for changing the program in response to the information transmitting member.

The invention will become more fully apparent from the following detailed description thereof taken in conjunction with the accompanying drawings.

DESCRIPTION OF THE PREFERRED EMBODIMENTS

Figure 1:
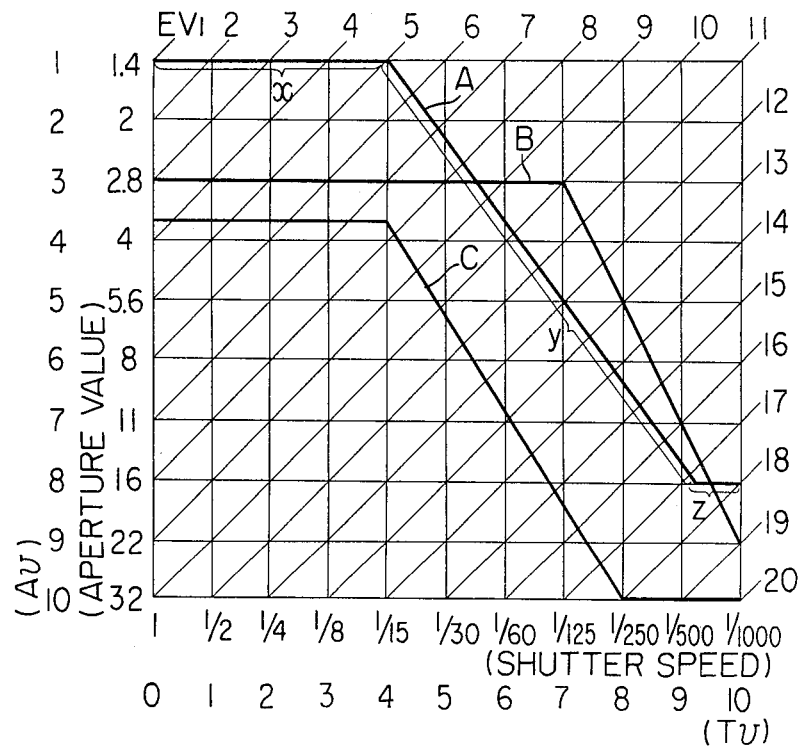
FIG. 1 is a program line diagram showing the program of shutter speed and aperture.

FIG. 1 is a program line diagram showing the programs of the shutter speed and aperture according to an embodiment of the present invention which will later be described. In FIG. 1, as typical examples, programs are shown for a standard lens having a focal length 50 mm, a maximum aperture, that is, a fully open F-number 1.4 and a minimum aperture, that is, a maximum F-number 16 (hereinafter referred to as the lens A), a telephoto lens having a focal length 135 mm, a fully open F-number F 2.8 and a maximum F-number F 22 (hereinafter referred to as the lens B), and a macro lens having a focal length 55 mm, a fully open F-number F 3.5 and a maximum F-number F 32 (hereinafter referred to as the lens C). (The term "program" used herein is a characteristic of combination between the shutter speed and aperture value of an interchangeable lens corresponding to the brightness of an object to be photographed, as indicated by curves A, B and C in FIG. 1.

These lenses A, B and C are hereinafter handled as being used for the so-called standard photography, telephoto photography and close-up photography.

This program line diagram is divided into three portions: a portion in which as Ev is increased, the shutter speed alone is varied with the aperture remaining to be the fully open F-number (hereinafter referred to as the x-portion), a portion in which both the aperture value and the shutter speed are varied (hereinafter referred to as the y-portion), and a portion in which the shutter speed alone is varied with the aperture remaining to be the maximum F-number or minimum aperture (hereinafter referred to as the z-portion).

Hereinafter, the relation in the y-portion shown in the program line diagram will be derived. For simplicity, APEX indication (Additive System of Photographic Exposure) (aperture value: Av, time value: Tv, exposure value: Ev, luminance value: Bv, ASA speed value: Sv) is used for the relation. The relation between Tv and Av representing the y-portion of FIG. 1(A) is as shown by the following equation (1).

$$Tv = 0.75\,Av + 3.25 \quad (1)$$
$$= 0.75\,(Ac - Avo) + 0.75\,Avo + 3.25$$

where Avo: Av during the opening of the lens. From this, the general formula of the y-portion may be expressed by the following equation (2):

$$Tv = \alpha(Av - Avo) + \beta Avo + \gamma \quad (2)$$

where $\alpha$, $\beta$ and $\gamma$ are constants. The reason why the variable of the aperture value is not Av but (Av−Avo) is that this is easier to handle in case of the TTL metering system.

In the APEX indication, there is the following relation amoung Av, Tv, Bv and Sv:

$$Av + Tv = Bv + Sv$$

and therefore, if equation (2) is transformed by the use of such relation, the following is obtained:

$$Tv = \alpha(Bv + Sv - Tv - Avo) + \beta Avo + \gamma$$

Further, if Tv in the right side is shifted to the left side and Tv is sought after, there is obtained equation (3).

$$Tv = \frac{\alpha}{1+\alpha}(Bv + Sv - Avo) \quad (3)$$

$$\frac{1}{1+\alpha}(\beta Avo + \gamma)$$

Equation (3) is an equation which is on the straight line of the y-portion of the program of FIG. 1 for a given object brightness, film sensitivity and fully open aperture of the lens and which may be used to calculate a shutter speed suited for the condition of proper exposure.

Since the x-portion and the z-portion are the areas in which no further control (variation) of the aperture is possible in accordance with each lens, the shutter speed alone is varied for the variation in Ev in the program line diagram. Therefore, the programs of the x-portion and z-portion will be automatically determined if the inclination of the y-portion is determined.

Figure 2:
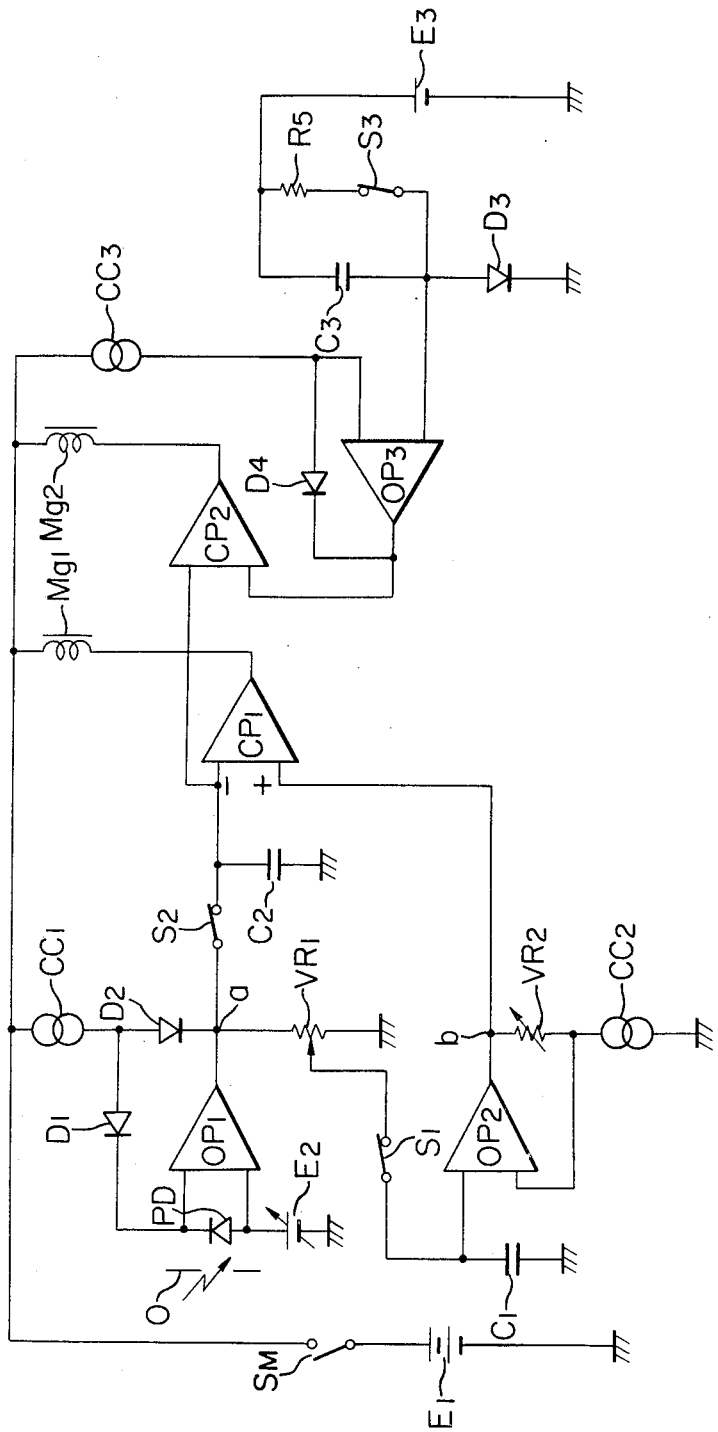
FIG. 2 is a circuit diagram showing an embodiment of the present invention.

Reference is now had to FIG. 2 to describe the circuit portion of an embodiment of the present invention and the operation thereof.

A photodiode PD for receiving the object light passed through the diaphragm O of the lens, diodes $D_1$ and $D_2$, a constant current source $CC_1$, an amplifier $OP_1$ and a variable constant voltage circuit $E_2$ for setting the film sensitivity information together constitute a TTL metering circuit. The metering output is indicative of a shutter speed corresponding to the brightness of the object of the fully open F-number, and appears at an output terminal a. Variable resisters $VR_1$ and $VR_2$ for receiving the information from an interchangeable lens which will later be described, a switch $S_1$ adapted to be opened immediately before the lens is stopped down, a capacitor $C_1$, an amplifier $OP_2$ and a constant current source $CC_2$ together constitute a program setting circuit. The resistance ratio of the variable resistor $VR_1$ corresponds to $\alpha/(1+\alpha)$ in equation (3) and it is set to a predetermined value in response to the mounting of an interchangeable lens with respect to the camera. Also, the resistance value of the variable resistor $VR_2$ responsive to the mounting of the interchangeable lens with respect to the camera is set to a predetermined value so as to exhibit $1/(1+\alpha)(\beta Avo+\gamma)$ of equation (3). That is the variable resistors $VR_1$ and $VR_2$ determine the inclination of the y-portion of the program line diagram in FIG. 1. The program output appears at an output terminal b. A switch $S_2$ and a capacitor $C_2$ constitute a memory circuit, and the charging voltage of the capacitor $C_2$ provides a memory output. A comparator $CP_1$ for comparing the program output with the memory output and an electromagnet $Mg_1$ for stopping the stop-down operation constitute an aperture control device. Comparator $CP_2$, an amplifier $OP_3$, diodes $D_3$ and $D_4$, a capacitor $C_3$, a resistor $R_5$, a trigger switch $S_3$, a constant current source $CC_3$ and an electromagnet $Mg_2$ together constitute a shutter speed control device.

When a shutter button is depressed a main switch $S_M$ is closed at a first stage of the depression to permit a current to flow from a power source battery $E_1$. The photodiode PD receives the light passed through a lens, not shown, and the diaphragm O and generates a photocurrent proportional to the intensity of the light. This photocurrent is logarithmically compressed by the amplifier $OP_1$ and the diode $D_1$. The constant current source $CC_1$ and the diode $D_2$ are for compensating for the temperature characteristic of the diode $D_1$. At this stage, the diaphragm of the lens is still fully open. Thus, the light impinging on the photodiode PD is the object light minus the information on the fully open F-number of the lens and the logarithmically compressed value thereof is (Bv−Avo) if expressed in APEX indication. Since a voltage corresponding to the film sensitivity information Sv is being applied to the input of the amplifier $OP_1$ by a variable constant voltage circuit $E_2$, the voltage $V_A$ at the output terminal a of the amplifier $OP_1$ becomes as shown by equation (4) below.

$$V_A = (Bv+Sv-Avo) \quad (4)$$

This voltage at the point a is divided by the variable resistor $VR_1$. Since this resistance ratio is set so as to be $\alpha/(1+\alpha)$ of equation (3), the divided voltage becomes $\alpha/(1+\alpha)(Bv+Sv-Avo)$. This voltage is applied as input to the amplifier $OP_2$ through the switch $S_1$. The output of the amplifier $OP_2$ is the divided voltage $\alpha/(1+\alpha)(Bv+Sv-Avo)$ plus the voltage drop $1/(1+\alpha)(\beta Avo+\gamma)$ across the variable resistor $VR_2$ by the constant current source $CC_2$. Thus, the voltage $V_B$ at the output terminal b of the amplifier $OP_2$ becomes as shown by equation (5) below.

$$V_B = \frac{\alpha}{1+\alpha}(Bv+Sv-Avo) + \frac{1}{1+\alpha}(\beta Avo+\gamma) \quad (5)$$

The voltage $V_B$ in equation (5) corresponds to Tv in equation (3).

When the shutter button is further depressed to a second stage, the diaphragm O of the lens is stopped down by an automatic stop-down mechanism but immediately before that, the switch $S_1$ is opened to cause the divided voltage of the variable resistor $R_1$ to be stored in the capacitor $C_1$ and the voltage $V_B$ is fixed. Thereafter, the aperture and the shutter speed are controlled in accordance with the program line diagram. The circuit operations in the x-, y- and z-portion of the program line diagram will hereinafter be described in succession.

First, when $E_V$ is in the state of the x-portion, the shutter speed is varied so as to provide proper exposure for the fully open aperture of the lens. That is, when the shutter button is depressed to the second stage, the voltage $V_B$ is greater than the voltage $V_A$ which shows a proper Tv for the fully open aperture of the lens. As a result, the output of the comparator $CP_1$ assumes H-level in a moment to cut off the current supply to the electromagnet $Mg_1$ which has so far been energized. By this, a stop-down preventing mechanism, not shown, is operated to prevent stop-down of the lens by the automatic stop-down mechanism. After a sufficient time to control the diaphragm in all cases has elapsed, the switch $S_2$ is open to cause the voltage $V_A$ to be stored in the capacitor $C_2$.

Thereafter, a mirror completes its upward movement and the shutter is released. At a point of time whereat the forward shutter curtain begins to move, the trigger switch $S_3$ is opened to start the operation of a time logarithmic conversion circuit constituted by an amplifier $OP_3$, a constant voltage circuit $E_3$, a capacitor $C_3$, diodes $D_3$ and $D_4$, a resistor $R_5$ and a constant current source $CC_3$. This circuit puts out a voltage corresponding to the Tv of the exposure time after the forward shutter curtain has begun to move. If the voltage corresponding to this Tv is coincident with the voltage $V_A$ stored in the capacitor $C_2$, the comparator $CP_2$ is operated and the electromagnet $Mg_2$ is deenergized to start movement of the rearward shutter curtain.

Next, when Ev is in the state of the y-portion, if the shutter button is depressed to the second stage, the switch $S_1$ is first opened to fix the voltage $V_B$. Next, as the diaphragm O is stopped down with time, the quantity of light impinging on the photodiode PD becomes the object brightness minus the information on the diaphragm actually stopped down at each point of time. Thus, the output voltage $V_A$ of the amplifier $OP_1$ becomes (Bv+Sv−Av) which represents Tv suited for the proper exposure condition corresponding to from time-to-time aperture information. The voltage $V_A$ and the stored voltage $V_B$ are compared with each other by the comparator $CP_1$. At a time point whereat the voltage $V_A$ is coincident with the voltage $V_B$, the output of the comparator $CP_1$ assumes H-level. Therefore, the current which has so far flowed to the electromagnet $Mg_1$ is cut off, whereby the stop-down preventing mechanism, not shown, is operated to stop the stop-down operation. After a sufficient time to control the diaphragm in all cases has elapsed, the switch $S_2$ is opened and the voltage $V_A$ is stored in the capacitor $C_2$. Thereafter, an operation similar to the operation of shutter speed control in the above-described x-portion takes place.

Finally, when $E_v$ is in the state of the z-portion, if the y-portion is followed, the diaphragm will be stopped down farther than the minimum diaphragm aperture and so, for the minimum diaphragm aperture of the lens, proper shutter speed is necessarily varied corresponding to $E_V$. That is, when the shutter button is depressed to the second stage, the diaphragm is stopped down to the minimum aperture and yet the voltage $V_B$ does not become higher than $V_A$ and therefore, the comparator $CP_1$ remains to put out L-level output. Accordingly, the stop-down preventing mechanism remains inoperative. Thereafter, when the switch $S_2$ is closed, the voltage $V_A$ is stored in the capacitor $C_2$ and then, as already described, the shutter speed is controlled in accordance with this voltage $V_A$.

The above-described exposure control need not be effected with different gradients as in the program line diagram shown in FIG. 1, but A, B and C in the program line diagram may be parallel. For this purpose, in equation (2), α should be constant, that is, the $VR_1$ should be designed so as not to be varied by the signal from the lens side.

In the above-described embodiment, as the means for controlling the diaphragm, use has been made of the so-called momentary stop-down photometry in which the output of the TTL metering circuit including from-time-to-time aperture value information is obtained in the course of the lens stop-down operation, whereas the present invention is not restricted thereto but the same effect may be obtained, for example, by means for controlling the diaphragm in accordance with the stored information of the metering circuit and the aperture value information obtained by a variable resistor, digital encoder or the like operatively associated with an aperture preset ring or the like, or means for converting the deflection of an ammeter needle which is deflected by the output of the metering circuit into a stepped cam stroke and controlling the diaphragm in accordance therewith.

Figure 3:
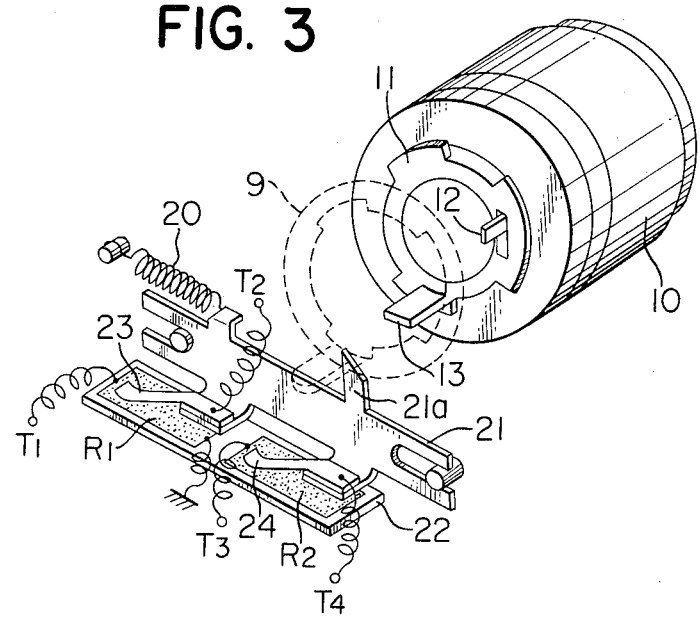
FIG. 3 shows an interlock device for varying the resistance values of variable resistors $VR_1$ and $VR_2$ shown in FIG. 2.

FIG. 3 illustrates the operative association between the camera body and the interchangeable lens for varying the resistance values of the variable resistors $VR_1$ and $VR_2$ shown in FIG. 2. The interchangeable lens 10 has a lens mount 11 coupled to a body side mount 9 provided on the camera body, an automatic diaphragm lever 12 positioned between a diaphragm blade and a camera side automatic stop-down mechanism for stopping down the diaphragm in response to said mechanism, and a fixed member 13. The fixed member 13 may be differently positioned depending on the type of the interchangeable lens.

On the camera body side there are provided a slide lever 21 biased in one direction by a spring 20 and a resistance plate 22 on which are formed resistors $R_1$ and $R_2$. Projectedly provided on the slide lever 21 is an information receiving member 21a opposed to the lens mounting opening of the body side mount 9. The slide lever 21 and the information receiving member 21a together constitute an engaging member. Brushes 23 and 24 slidable on the respective resistors are provided on the slide lever 21. Thus, the resistor $R_1$ and the brush 23 together constitute a variable resistor $VR_1$, and the resistor $R_2$ and the brush 24 together constitute a variable resistor $VR_2$, and necessary resistance values are obtained between terminals $T_1$ and $T_2$ and between terminals $T_3$ and $T_4$.

To mount the lens 10 on the camera body, the lens mount 11 is inserted in the body side mount 9 and rotated clockwisely. As this time, the fixed member 13 engages the information receiving member 21a projectedly provided on the slide lever 21. When the lens is further rotated clockwisely, the slide lever 21 slides rightwardly as viewed in FIG. 3, and in response thereto, the brushes 23 and 24 slide on the resistors $R_1$ and $R_2$. When the mounting operation is completed and the lens is stopped from rotating, the sliding movement of the slide lever 21 is also stopped and the resistance values between the terminals $T_1$ and $T_2$ and between the terminals $T_3$ and $T_4$ are fixed. This is the operation for varying the resistance values of the variable resistors $VR_1$ and $VR_2$ in FIG. 2.

The position whereat the fixed member 13 is provided differs from the lens A to the lens B and the lens C and in response to the mounting operation of each lens onto the camera, the program as shown in FIG. 1 suited for each lens is selected.

Figure 4:
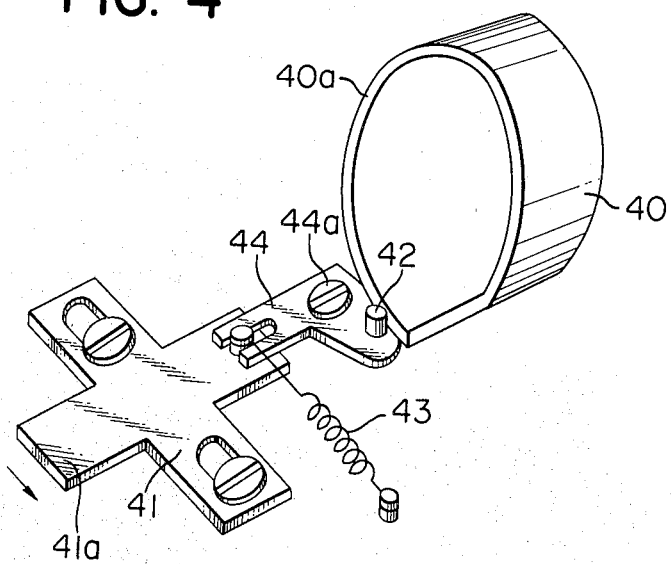
FIG. 4 shows a structure of information means in a zoom lens.
Figure 5:
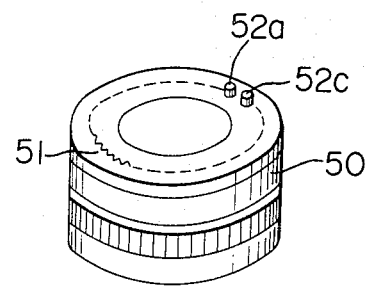
FIG. 5 is an embodiment which has information means as an electrical quantity.

In a zoom lens, the focal length is variable by zooming and therefore, a lever 41a engaged with the information receiving member 21a of FIG. 3 may be made variable by rotation of a zooming ring 40 so that the program may be varied in response to the zooming ring 40, as shown in FIG. 4. In FIG. 4, one end 40a of the zooming ring 40 provides a cam surface and a pin 42 is normally biased into contact with this cam surface by a spring 43. A member 44 on which the pin 42 is fixed is rotatable about a shaft 44a and on the other hand, it is pin-groove-engaged with a linearly movable piece 41 having a lever 41a. Therefore, rotation of the zooming ring 40 causes rotation of the member 44 about the shaft 44a, which in turn moves the lever 41 in the direction of arrow.

Further, the fixed member 13 and the lever 41a as the above-described information member may be made into two members corresponding to the variable resistors $VR_1$ and $VR_2$.

Still further, since the relative movement velocity of objects at a long distance and at a short distance during photography is higher for the short distance, it is possible to replace the zooming ring 40 of FIG. 4 by a distance ring and to set such that a program in which the shutter speed is higher is adopted for the short distance.

A device in which a body and an interchangeable lens are electrically connected together and resistors corresponding to the F-number and distance are provided in the interchangeable lens is known and therefore, it is also possible to provide, for each interchangeable lens, a resistor 51 corresponding to the main usage of photography of the lens 50 and to make the program variable by electrical means. In this case, design may be made such that terminals 52a and 52b are in contact with the unshown contact of the body so that the resistor 51 in the lens is parallel-connected with the resistors $VR_1$ and $VR_2$ of FIG. 2, for example.

According to the present invention, as has hitherto been described, program can be suitably selected in accordance with the type of interchangeable lens in a program exposure control device of a camera which permits interchange of the lens and thus, the most effective program can be selected for lenses of different nature such as standard, telephoto or macro lenses. This means a great convenience for various types of photography.

I claim:

1. In a camera of the interchangeable lens type having a program exposure control device which is so programmed that a combination of shutter speed and aperture value may be determined according to the brightness of the object to be photographed and film speed and a lens mount; and an interchangeable lens mounted detachably on said body through said mount, the improvement comprising:
   (a) program varying means provided in said program exposure control device, the program of said program exposure control device being capable of being arbitrarily selected by the setting of said program varying means;
   (b) information means provided on said interchangeable lens, the information possessed by said information means corresponding to the main usage of photography of the lens; and
   (c) interlock means for setting said program varying means so that when said interchangeable lens is mounted on said body, said program varying means selects a program corresponding to the information possessed by said information means.

2. The camera according to claim 1, wherein said information means possesses said information as a mechanical quantity.

3. The camera according to claim 2, wherein said information means is a member fixed to said interchangeable lens.

4. The camera according to claim 3, wherein said program varying means varies the resistance value determining the program characteristic of said program exposure control device, and said interlock means selects said resistance value corresponding to the position of said fixed member when said interchangeable lens has been mounted on said body.

5. The camera according to claim 4, wherein said program varying means is a slidable piece of variable resistance, and said interlock means is provided integrally with said slidable piece and engageable with said fixed member in response to the mounting of said interchangeable lens to relate the position of said slidable piece to said fixed member.

6. The camera according to claim 5, wherein said member is fixed to said lens so that it is projected into said mount when said lens is mounted on said body, and said interlock means is provided in said body so as to engage said fixed member.

7. The camera according to claim 6, wherein said interlock means has an engaging member engaged with said fixed member and a spring for biasing said engaging member in one direction, and the direction of bias of the spring is determined so that when said lens is mounted, said fixed member moves said engaging member against the biasing force of said spring.

8. The camera according to claim 7, wherein said information means is a lever provided on a zoom lens as said interchangeable lens, and said lever changes its position in response to adjustment of the focal length of said zoom lens.

9. The camera according to claim 1, wherein said information means possesses said information as an electrical quantity.

* * * * *

UNITED STATES PATENT AND TRADEMARK OFFICE
CERTIFICATE OF CORRECTION

PATENT NO. : 4,352,548

DATED : October 5, 1982

INVENTOR(S) : KENJI TOYODA

It is certified that error appears in the above—identified patent and that said Letters Patent is hereby corrected as shown below:

Column 1, line 10, "for" should be --of--.

Column 4, line 11, "$V_A = Bv + Sv - Avo)(4)$" should be --$V_A = Bv + Sv - Avo)$ . . . . . . . . . . . . . (4)--.

Column 8, line 36 (Claim 8, line 1), "7" should be --2--.

*Signed and Sealed this*

*Eighteenth* Day of *January 1983*

[SEAL]

*Attest:*

GERALD J. MOSSINGHOFF

*Attesting Officer*     *Commissioner of Patents and Trademarks*